United States Patent
Khoryaev et al.

(10) Patent No.: US 9,713,117 B2
(45) Date of Patent: Jul. 18, 2017

(54) DEVICE-TO-DEVICE ASSISTED POSITIONING IN WIRELESS CELLULAR TECHNOLOGIES

(71) Applicant: Intel Corporation, Santa Clara, CA (US)

(72) Inventors: Alexey Khoryaev, Nizhny Novgorod (RU); Sergey Panteleev, Nizhny Novgorod (RU); Mikhail Shilov, Nizhny Novgorod (RU); Andrey Chervyakov, Nizhny Novgorod (RU); Yang Tang, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/671,803

(22) Filed: Mar. 27, 2015

(65) Prior Publication Data

US 2016/0095080 A1 Mar. 31, 2016

Related U.S. Application Data

(60) Provisional application No. 62/055,474, filed on Sep. 25, 2014.

(51) Int. Cl.
*H04W 64/00* (2009.01)
*H04W 76/02* (2009.01)
(Continued)

(52) U.S. Cl.
CPC ........... *H04W 64/00* (2013.01); *G01S 5/0284* (2013.01); *H04W 4/023* (2013.01);
(Continued)

(58) Field of Classification Search
CPC .. G03G 15/556; H04W 64/00; H04W 76/023; H04W 92/18; H04W 72/0406;
(Continued)

(56) References Cited

U.S. PATENT DOCUMENTS

| 2006/0267841 A1 | 11/2006 | Lee et al. |
| 2010/0046434 A1* | 2/2010 | Weniger ................. H04W 8/06 370/328 |

(Continued)

OTHER PUBLICATIONS

International Search Report and Written Opinion received in corresponding PCT Application PCT/US15/46329 dated Oct. 23, 2015.

*Primary Examiner* — Phuoc H Doan
(74) *Attorney, Agent, or Firm* — Ledell Ansari, LLP

(57) ABSTRACT

The position of User Equipment (UE) may be determined based on information communicated through direct UE-to-UE communications to obtain additional measurements of position metrics that can be used to determine relative or absolute positions of the UE. In one implementation, a UE may receive, via a direct connection with a second UE, a positioning reference signal from which timing information, relating to distance between the UE and second UE, is derivable; determine, based on the positioning reference signal, a first position metric that relates to a position of the UE with respect to the second UE; and determine, based at least on position metric, a location of the UE.

25 Claims, 8 Drawing Sheets

(51) Int. Cl.
*H04W 4/02* (2009.01)
*G01S 5/02* (2010.01)
*H04W 92/18* (2009.01)
*G01S 5/00* (2006.01)

(52) U.S. Cl.
CPC ......... *H04W 76/023* (2013.01); *G01S 5/0072* (2013.01); *H04W 92/18* (2013.01)

(58) Field of Classification Search
CPC . H04L 9/0838; H04L 63/0442; H04L 9/3226; H04L 67/1095; G06F 9/542; G06F 3/0481; G08G 1/166; H04N 1/6077
USPC ...... 455/456.1; 345/174, 173, 156; 340/447; 370/329
See application file for complete search history.

(56) References Cited

U.S. PATENT DOCUMENTS

| | | |
|---|---|---|
| 2012/0157121 A1 | 6/2012 | Li et al. |
| 2012/0184301 A1 | 7/2012 | Jovicic |
| 2013/0045759 A1 | 2/2013 | Smith |
| 2013/0215851 A1* | 8/2013 | Sato ..................... H04L 5/0007 370/329 |
| 2013/0252628 A1* | 9/2013 | Kuehnel ................ H04W 4/02 455/456.1 |

* cited by examiner

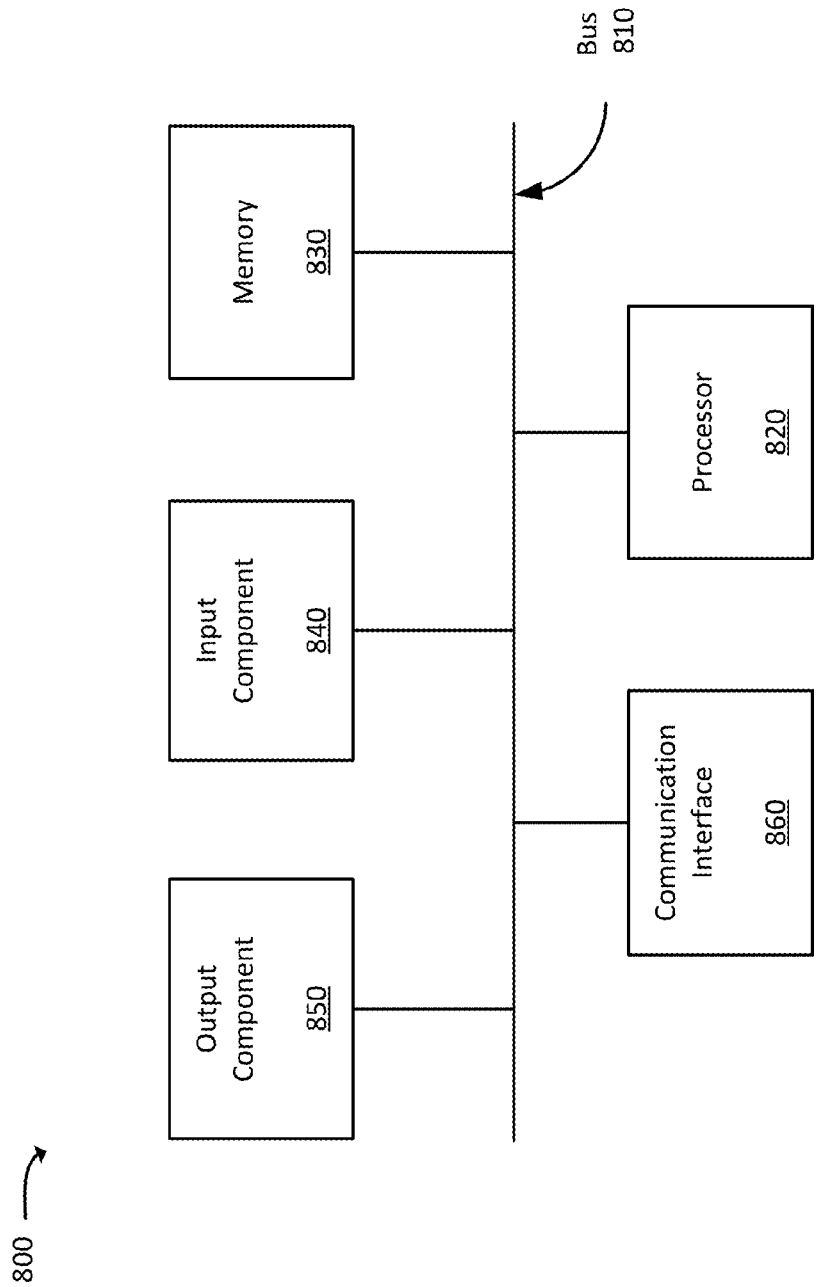

DEVICE-TO-DEVICE ASSISTED POSITIONING IN WIRELESS CELLULAR TECHNOLOGIES

RELATED APPLICATIONS

The present application claims the benefit of U.S. Provisional Patent Application No. 62/055,474, which was filed on Sep. 25, 2014, and which is hereby incorporated by reference as though fully set forth herein.

BACKGROUND

Wireless networks provide network connectivity, through radio interfaces, to mobile communication devices, such as smart phones. In wireless networks, positioning services, that determine the location of a communication device, can be a desirable feature. For instance, determining the location of a mobile device can be important when providing navigation services, emergency services, or for other services that may be provided for the mobile device.

Accurately determining the position of a mobile device, in a variety of different situations/environments, can be challenging. In specifications published by the $3^{rd}$ Generation Partnership Project (3GPP), three major device positioning services are described: Enhanced Cell ID (ECID); Assisted Global Navigation Satellite Systems; and downlink Observed Time Difference of Arrival (OTDOA). However, obtaining accurate positioning using wireless technologies suffers from multiple challenges that can result, in many situations, in coarse location accuracy. The challenges may include poor performance in indoor environments due to high penetration loss and the Non-Line-of-Sight (NLOS) nature of signal propagation from the sources of positioning signals.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 8 is a diagram of example components of a device.

DETAILED DESCRIPTION OF PREFERRED EMBODIMENTS

Figure 1:
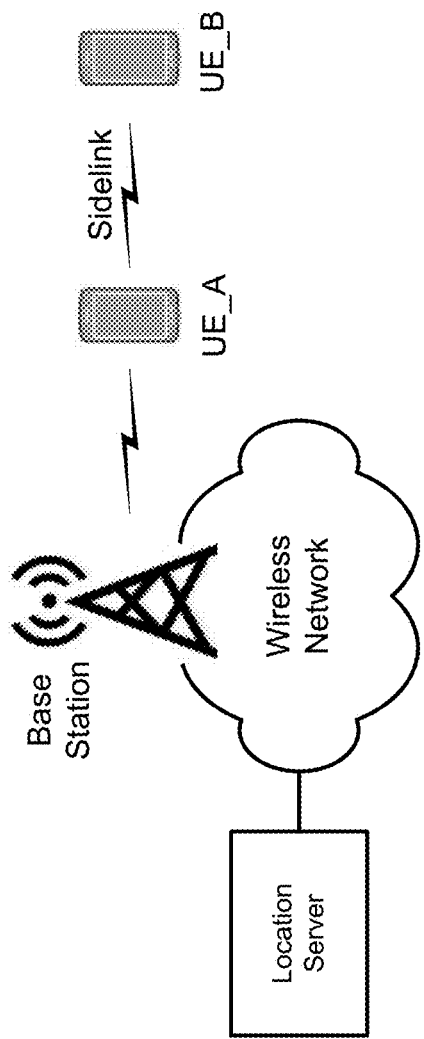
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may provide for the determination of the position of mobile devices based on information communicated through device-to-device (D2D) communications to obtain additional measurements of position metrics that can be used to determine relative or absolute positions of the mobile devices. In some implementations, the additional position metrics may be used, in conjunction with metrics obtained through traditional positioning techniques, to more accurately determine device positions.

In one implementation, User Equipment (UE) may include processing circuitry to: connect with a cellular network via a radio interface; connect with one or more other UEs, using the radio interface, to form a direct connection with the other UEs; receive, via the direct connection with the other UEs, first positioning reference signals from which first timing information, relating distances between the UE and other UEs, is derivable; determine, based on the first positioning reference signals, first position metrics that relate to a position of the UE with respect to the other UEs; receive, via the cellular network, a second positioning reference signal from which second timing information, relating to distance between the UE and a base station associated with the cellular network, is derivable; determine, based on the second positioning reference signal, a second position metric that relates to a position of the UE with respect to the base station; and determine, based at least on the first and second position metrics, a location of the UE.

Additionally, the processing circuitry, when determining the location of the UE, may calculate the location of the UE using multilateration-based or proximity detection techniques. Alternatively or additionally, the processing circuitry, when determining the location of the UE, may: transmit, via the cellular network, the first and second position metrics to a location server; and receive, from the location server, an indication of the location of the UE.

In some implementations, the processing circuitry may decode payload data, associated with the first positioning reference signals, to obtain an indication of a location of one or more of the other UEs. Additionally, in some implementations, the processing circuitry may receive a number of positioning reference signals, from a corresponding number of the other UEs, wherein timing information, associated with the positioning reference signals, is synchronized based on a synchronization procedure performed via the cellular network.

In some implementations, the first timing information may be synchronized, with the other UEs, based on a two-way timing estimation performed between the UE and the other UEs. The first position metrics may include one or more of: positioning reference signal time of arrival; differences in time of arrival between positioning reference signals; differences in time of arrival between a positioning reference signal and a reference clock; positioning reference signal received power; positioning reference signal received quality; timing estimation accuracy indicators; location information; or timing information sufficient for solution of location equations.

In some implementations the processing circuitry is further to: receive configuration information, via the cellular network, relating to a configuration of the first positioning reference signals. Alternatively or additionally, in some implementations, the location of the UE may be determined locally, by the UE, by an application that receives at least the first and second position metrics from lower layer processing at the UE.

Consistent with another aspect described herein, a UE may include a radio interface; a computer-readable medium to store processor executable instructions; and processing circuitry to execute the processor executable instructions. The processing circuitry may execute the instructions to: connect, via a Sidelink channel associated with the radio interface, with a second UE that is in proximity to the UE; connect, via the radio interface, with a cellular network; transmit, to the second UE and over the Sidelink channel, a first positioning reference signal from which first timing information, relating to a distance between the UE and second UE, is derivable; transmit, via the radio interface, a second positioning reference signal from which second timing information, relating to a distance between the UE and a base station associated with the cellular network, is derivable; and receive, from a location server and via the radio interface, a location of the UE that was determined based at least on the first and second positioning reference signals.

Consistent with another aspect described herein, a location sever may include processing circuitry to: store indications of locations of a number of anchor UEs deployed as part of a wireless network; receive first position metrics from the anchor UEs, the first position metrics including information relating to a position of a target UE relative to the anchor UEs; receive second position metrics relating to a position of the target UE relative to base stations in a wireless cellular network; and calculate, based on the first and second position metrics, a location of the target UE.

In some implementations, wherein the first position metrics may be based on communication of positioning reference signals exchanged over Sidelink channels formed between the target UE and the anchor UEs. In some implementations, the anchor UEs may each be associated with a fixed location. In some implementations, the processing circuitry is further to: receive third position metrics from a number of non-anchor UEs, wherein the calculation of the location of the target UE is additionally based on the third position metrics. In some implementations, the processing circuitry is further to: transmit the calculated location of the target UE to the target UE.

Consistent with another aspect described herein, a method may include connecting with a cellular network using a radio interface; connecting with a second UE, using the radio interface, to form a direct connection with the second UE; receiving, via the direct connection with the second UE, a first positioning reference signal from which first timing information, relating to distance between the UE and second UE, is derivable; determining, based on the first positioning reference signal, a first position metric that relates to a position of the UE with respect to the second UE; receiving, via the cellular network, a second positioning reference signal from which second timing information, relating to distance between the UE and a base station associated with the cellular network, is derivable; determining, based on the second positioning reference signal, a second position metric that relates to a position of the UE with respect to the base station; and determining, based at least on the first and second position metrics, a location of the UE.

Consistent with another aspect described herein, a UE may include means for connecting with a cellular network using a radio interface; means for connecting with a second UE, using the radio interface, to form a direct connection with the second UE; means for receiving, via the direct connection with the second UE, a first positioning reference signal from which first timing information, relating to distance between the UE and second UE, is derivable; means for determining, based on the first positioning reference signal, a first position metric that relates to a position of the UE with respect to the second UE; means for receiving, via the cellular network, a second positioning reference signal from which second timing information, relating to distance between the UE and a base station associated with the cellular network, is derivable; means for determining, based on the second positioning reference signal, a second position metric that relates to a position of the UE with respect to the base station; and means for determining, based at least on the first and second position metrics, a location of the UE.

FIG. 1 illustrates an example overview of an implementation described herein. As shown in FIG. 1, a base station, such as one associated with a wireless cellular network, may communicate with a mobile device (called User Equipment (UE)), labeled as UE_A. UE_A may also communicate directly with another UE, labeled as UE_B, to implement a D2D discovery or communication channel. In 3GPP, the D2D discovery or communication channel may be referred to as a Sidelink channel. A location server may perform positioning services for the wireless network and/or for the UEs. The location server may, for example, obtain a number of parameters, potentially including parameters relating to different types of measured position metrics (e.g., signal timing data, signal received power data) and/or parameters relating to calculated positions (e.g., coordinate data obtained from satellite assisted position systems or preconfigured during terminal installation, distance measurement relative to a reference node), and based on the parameters, determine a location (e.g., a geographical position) of UE_A. In some implementations, the location server may alternatively or additionally determine the current speed and/or direction of travel for UE_A.

At least some of the position metrics may be obtained from the Sidelink channel. For example, UE_A and UE_B may transmit and receive positioning signals (e.g., reference signals and/or reference signals accompanied with data (payload)), over the Sidelink channel, based on which the position metrics may be calculated. In some implementations, the position metrics obtained over the Sidelink channel may be combined, such as by the location server, with traditional position metrics (e.g., obtained via UE-eNB link(s)), to obtain a more accurate determination of the target UE's (e.g., UE_A) location.

In one implementation, the location of UE_B may be known in a relatively precise manner. For example, the position of UE_B may have been accurately determined using traditional positioning techniques (e.g., UE_B may be outdoors and have good line-of-sight links with global positioning satellites) or UE_B may be a fixed device installed by an operator of the wireless network. When installed at a fixed location, UE_B may be referred to as an "anchor" device. Alternatively, "anchor" terminal may be a terminal that reliably knows its own coordinate. The presence of anchor devices, in the vicinity of UE_A, may assist in obtaining a more accurate location determination.

In some implementations, the location server may be omitted and the location of UE_A may be determined by UE_A and/or by another device. The positioning in this case may be done at the UE side, e g running a self-positioning application that takes into account information about signal location parameters from either sidelink and/or cellular links.

Using positioning metrics, obtained from Sidelink channels, may lead to improved UE location determination in a number of ways. For example, by using nearby UEs to assist in location determination, an increased number of sources may be used to obtain positioning metrics. That is, the deployment density of other UEs can be higher than the density of the deployed base stations. Additionally, as mentioned, in positioning scenarios that are particularly challenging, anchor UEs may be intentionally preinstalled inside buildings to increase location accuracy. Installing additional anchor UEs can potentially be a cost effective solution relative to the cost of installing more base stations. Moreover, in future cellular systems, in order to effectively support vehicular to vehicular applications, road infrastructure units (based on UE implementation) can be installed and may serve as an anchor nodes for terminal positioning using D2D air-interface.

Additionally, because Sidelink channels tend to be created based on proximity, the fact that a Sidelink channel exists, such as with a UE having a known location, can be used to improve location determination for a target UE. That is, the UE with known coordinates can provide a rough position estimate of the target UE. The power being used for the Sidelink channel can additionally be a factor that is used to determine the location of the target UE (e.g., a low power Sidelink channel may indicate that the target UE is close). The presence of other UEs in proximity can further improve positioning accuracy.

Additionally, using Sidelink channels in position determination may be used to correct inaccuracies due to the hearability problem. The hearability problem may tend to occur in indoor environments, where due to significant wall penetration loss, UEs may typically be able to detect a smaller number of base stations relative to being outdoors. Using Sidelink channels associated with other UEs, such as anchor UEs, may reduce the indoor hearability problem. The anchor UEs may perform functions in addition to location determination assistance. For example, the anchor UEs may include smart meters, advertisement devices providing advertisement in shopping malls, or other UEs for which location determination assistance is not the primary function. In such scenarios, three-dimensional positioning accuracy may be improved substantially, especially for the vertical coordinate, which may typically have poor accuracy, since base stations tend to be deployed at approximately the same height and may be positioned relatively far from one another that lead to large geometrical dilution of vertical positioning precision.

Additionally, using Sidelink channels in position determination may be used to improve the estimation accuracy of conventional position determination techniques. Due to the proximate nature of Sidelink communication, the propagation conditions between UEs, in a Sidelink channel, may be better relative to the base station to UE propagation conditions. For instance, the chance of having a line-of-sight link may be higher due to shorter distance and thus the effect of distortion due to non-line-of-sight links can be reduced. In addition, the signal to noise ratio on Sidelink channels may be better than UE to base station links.

Figure 2:
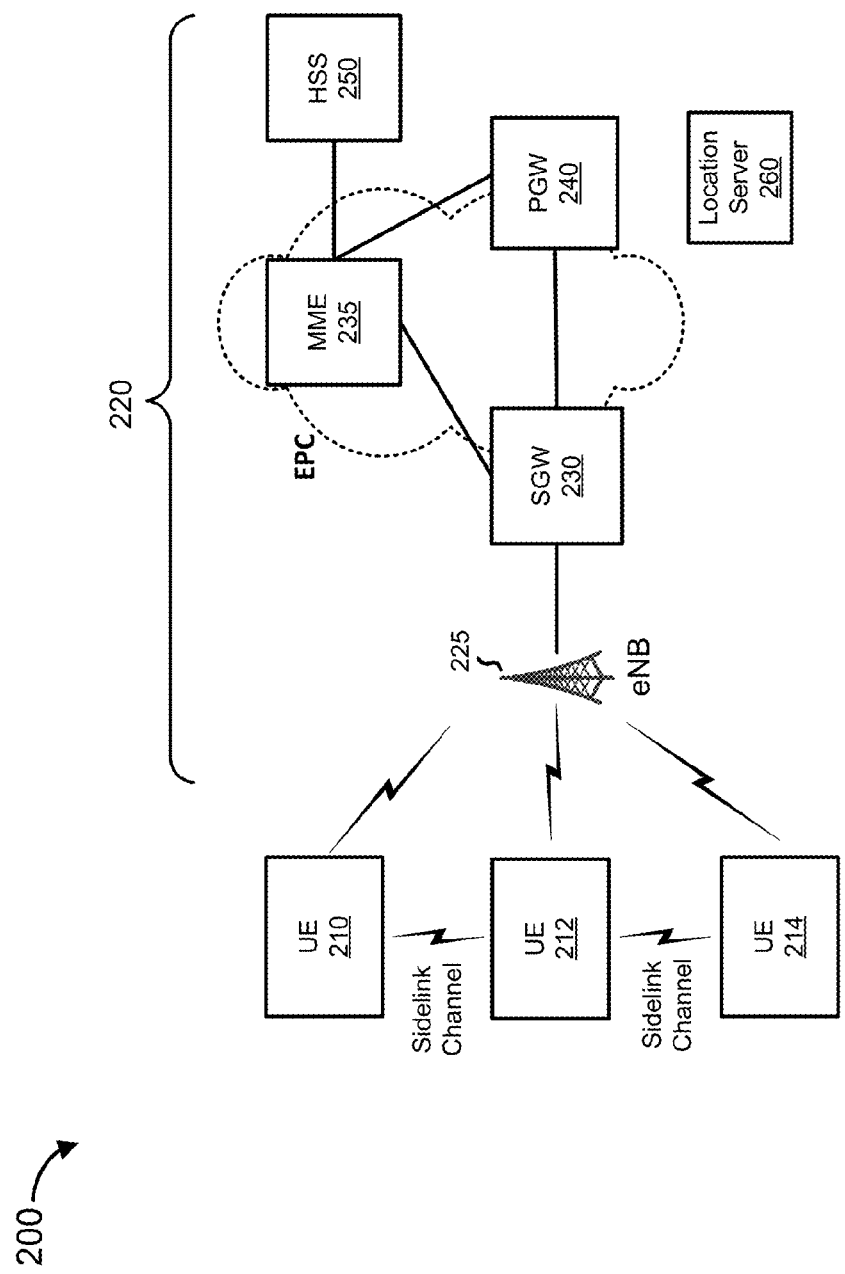
FIG. 2 is a diagram of an example environment in which systems and/or methods described herein may be implemented.

FIG. 2 is a diagram of an example environment 200 in which systems and/or methods described herein may be implemented. As illustrated, environment 200 may include UEs 210, 212, and 214. Although three UEs are illustrated in FIG. 2, in practice, environment 200 may include more or fewer UEs.

Environment 200 may additionally include wireless network 220. Wireless network 220 may include one or more networks that provide wireless network connectivity to UEs 210-214. For example, wireless network 220 may represent a wireless network that provides cellular wireless coverage. In some implementations, wireless network 220 may be associated with a 3GPP/Long Term Evolution (LTE) based-network. Wireless network 220 may include a Radio Access Network (RAN) that includes one or more base stations 225 and an evolved packet core (EPC). In the context of an LTE-based network, base station 225 may be referred to as an evolved node B (eNB). The EPC may include serving gateway (SGW) 230, mobility management entity (MME) 235, and packet data network gateway (PGW) 240. Home Subscriber Server (HSS) 250 and location server 260, which may be associated with the EPC, wireless network 220, or with an external network, are also illustrated in FIG. 2.

UEs 210-214 may each include a portable computing and communication devices, such as a personal digital assistant (PDA), a smart phone, a cellular phone, a laptop computer with connectivity to a cellular wireless network, a tablet computer, etc. UEs 210-214 may also include non-portable computing devices, such as desktop computers, consumer or business appliances, or other devices that have the ability to connect to wireless network 220. UEs 210-214 may connect, through a radio link, to wireless network 220.

UEs 210-214 may include radio interfaces that allow UEs 210-214 to connect, via direct wireless connections, to one another. For example, UEs 210-214 may each include a first radio transceiver to connect to a cellular access network, such as a 3GPP/Long Term Evolution (LTE) based-network (i.e., wireless network 220), and a second radio transceiver to implement WiFi-based communications (e.g., Institute of Electrical and Electronics Engineers' (IEEE) 802.11-based communications). UEs 210-214 may discover one another through direct discovery or with the assistance of wireless network 220. UEs 210-214 may then connect directly to one another (e.g., via a WiFi direct path or through an Evolved Universal Terrestrial Radio Access (E-UTRA) direct communication path that does not use wireless network 220) to engage in Sidelink communications.

eNB 225 may include one or more network devices that receive, process, and/or transmit traffic destined for and/or received from UEs 210-214. eNB 225 may provide the wireless (i.e., radio) interface with UEs 210-214.

SGW 230 may include one or more network devices that route data of a traffic flow. SGW 230 may aggregate traffic received from one or more eNBs 225 and may send the aggregated traffic to an external network via PGW 240. SGW 230 may also act as a mobility anchor during inter-base station handovers.

MME 235 may include one or more computation and communication devices that act as a control-node for eNB 225 and/or other devices that provide the air interface for wireless network 220. For example, MME 235 may perform operations to UEs 210-214 with wireless network 220, to establish bearer channels (e.g., traffic flows) associated with a session with UEs 210-214, to hand off UEs 210-214 to another network, and/or to perform other operations. MME 235 may perform policing operations on traffic destined for and/or received from UEs 210-214.

PGW 240 may include one or more network devices that may aggregate traffic received from one or more SGWs 230, and may send the aggregated traffic to an external network.

PGW 240 may also, or alternatively, receive traffic from the external network and may send the traffic toward UEs 210-214 via SGW 230, and/or eNB 225.

HSS 250 may include one or more devices that may manage, update, and/or store, in a memory associated with HSS 250, profile information associated with a subscriber. The profile information may identify applications and/or services that are permitted for and/or accessible by the subscriber; a mobile directory number (MDN) associated with the subscriber; bandwidth or data rate thresholds associated with the applications and/or services; and/or other information. The subscriber may be associated with UEs 210-214. Additionally, or alternatively, HSS 250 may perform authentication, authorization, and/or accounting operations associated with the subscriber and/or a communication session with UEs 210-214.

Location server 260 may represent functionality, implemented by one or more network devices, to perform position determination functions for UEs 210-214. For example, location server 260 may receive and store parameters, relating to location determination, from UEs 210-214, eNBs 225, or from other devices. Some network devices may be located at a fixed, known location. For example, eNBs 225 and anchor UEs 210-214 may be installed at a fixed location. Location server 260 may store the locations of these devices. Location server 260 may periodically or occasionally calculate the locations of UEs 210-214 and maintain an up-to-date data structure that indicates the current positions of UEs 210-214. Based on the parameters, and based on the known locations of various devices, location server 260 may determine the current location of a target UE, such as one of UEs 210-214, using location calculation techniques, such as multilateration-based or proximity detection based techniques.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

As previously mentioned, in some situations, UEs in direct communication with a target UE (i.e., a UE for which the location of the UE is to be determined), may be associated with a known location. These UEs may be referred to as "anchor" UEs. Anchor UEs may include UEs that are installed, by a network provider, at fixed locations for the purpose of acting as an anchor terminal. In some implementations, an anchor UE may also include a mobile UE (such as one in use by a user) for which the location of the UE accurately known (e.g., the UE may be outdoors and in a region for which accurate positioning is possible using satellite positioning technologies).

Figure 3:
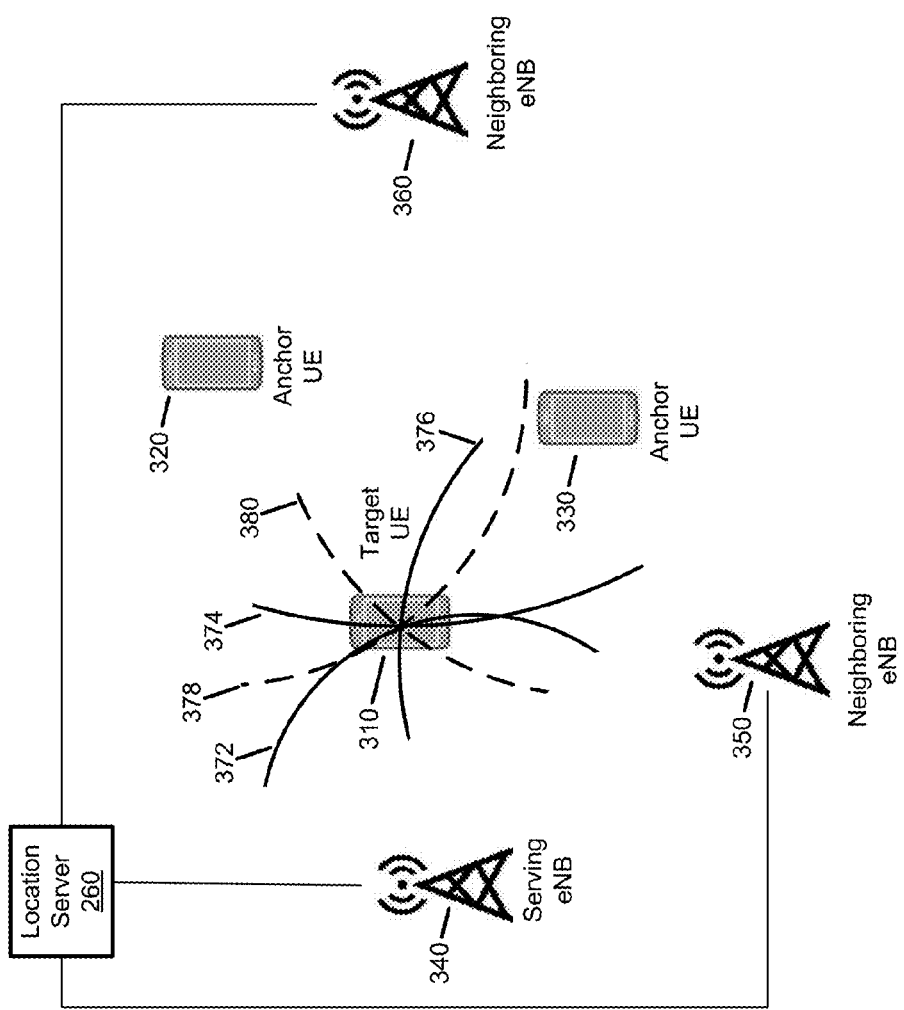
FIG. 3 is a diagram conceptually illustrating position determination, of a target UE, using anchor UEs.

FIG. 3 is a diagram conceptually illustrating position determination, of a target UE, using anchor UEs. In FIG. 3, assume that it is desired to obtain the location of UE 310 ("target UE"). Anchor UEs 320 and 330 may be in the vicinity of target UE 310. Target UE 310 may be attached to serving eNB 340. Additionally, two other eNBs, shown as neighboring eNBs 350 and 360, may be close enough to target UE 310, so it can receive positioning reference signals from neighboring eNBs 350 and 360.

eNBs 340-360 may include internal reference clocks that are synchronized with respect to one another. Additionally, eNBs 340-360 may broadcast synchronization signals to synchronize the reference clocks of UEs 310-330. The synchronization of the reference clocks at eNBs 340-360 and UEs 310-360 may allow for positioning reference signals to be transmitted and for timing information to be extracted by a receiving UE, such as target UE 310. In some implementations, the reference clocks of UEs 310-330, instead of being synchronized by synchronization signals from an eNB, may be synchronized based on one of UEs 310-330 transmitting the synchronization or reference signals. In some implementations, anchor UEs 320-330 may be configured to remain in the sleep or low-power mode for the majority of the time, but be configured, such as by eNBs 340-360, to wake up at predetermined intervals to process the synchronization signals and/or transmit positioning reference signals for the purpose of D2D assisted positioning.

In FIG. 3, target UE 310 may receive positioning reference signals from eNBs 340-360 and anchor UEs 320 and 330. The positioning reference signals from anchor UEs 320 and 330 may include signals transmitted over direct Sidelink channels. The positioning reference signals from eNBs 340-360 may include signals transmitted over the cellular links associated with wireless network 220. In one implementation, the positioning reference signal received by target UE 310 may include timing information, which may relate to a distance between target UE 310 and the transmitting source. For example, differences in the timing information from the various sources (e.g., eNBs 340-360 and anchor UEs 320 and 330) and/or signal time of arrival values may correspond to a distance of target UE 310 from the transmitting source. Because the location (e.g., as a three-dimensional coordinate value) of each of the transmitting sources may be known, multilateration-based techniques may be applied to the calculated distances to determine the location of target UE 310.

In some implementations, target UE 310 may autonomously detect the anchor UEs that are in proximity of target UE 310. Alternatively or additionally, target UE 310 may receive information, from serving eNB 340, that indicates a set of potential nearby anchor UEs. The information from serving eNB 310 may include configuration information relating to the positioning reference signal.

In FIG. 3, multilateration is graphically illustrated by arcs 372-380, which may each indicate an arc of a particular distance from a transmitting source. The point at which the various arcs intersect may correspond to the location of target UE 310. As illustrated, arc 372 correspond to a particular distance from serving eNB 340; arc 374 may correspond to a particular distance from neighboring eNB 360, arc 376 may correspond to a particular distance from neighboring eNB 350; arc 378 may correspond to a particular distance from anchor UE 320; and arc 380 may correspond to a particular distance from anchor UE 330.

In some implementations, the calculation of the location of target UE 310 may be performed by target UE 310. Alternatively or additionally, the calculation of the location of target UE 310 may be performed by, or with the assistance of, location server 260. For example, UEs 310-330 and eNBs 340-360 may transmit, via wireless network 220, positioning metrics derived from the positioning reference signals, as well as potentially other information, such as measured values relating to signal strength of the positioning reference signals, to location server 260. By using Sidelink channels to obtain additional positioning metrics, the location of target UE 310 may potentially be more accurately determined relative to an implementation in which position metrics are obtained only based on communications with eNBs 340-360.

Figure 4:
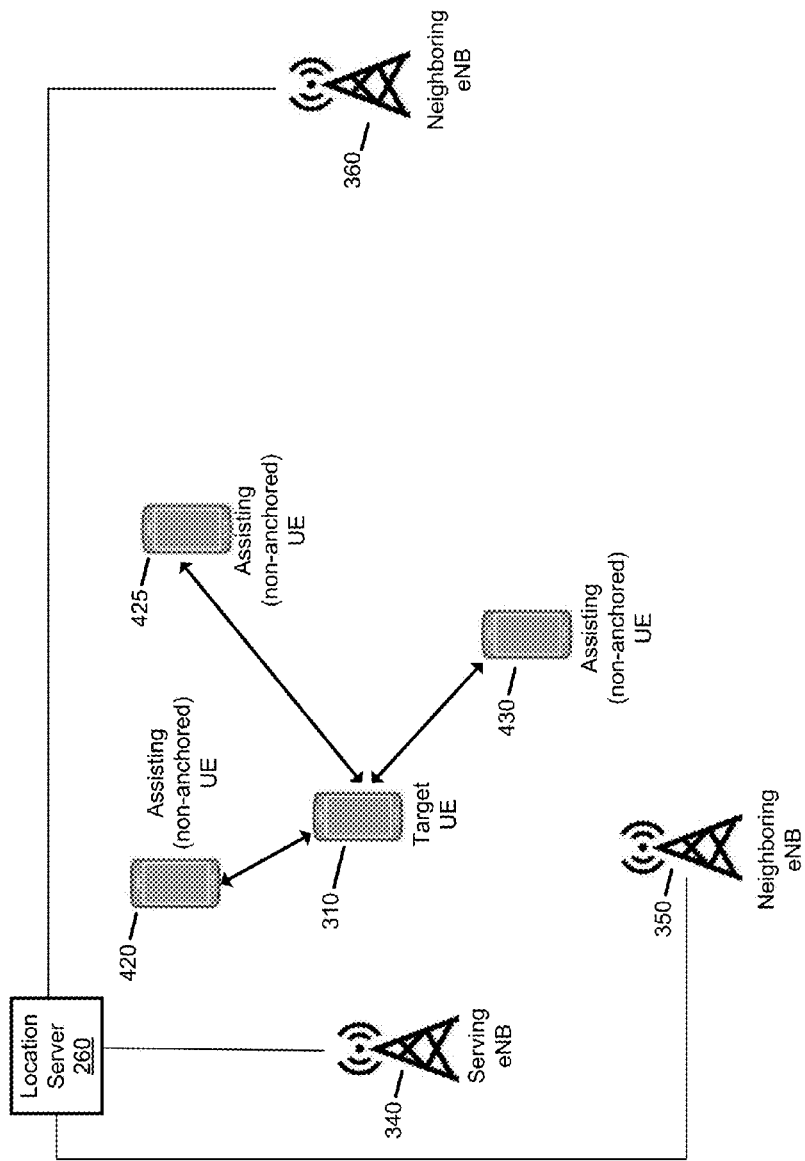
FIG. 4 is a diagram conceptually illustrating position determination, of a target UE, using non-anchored UEs, called assisting UEs herein.

FIG. 4 is a diagram conceptually illustrating position determination, of a target UE, using non-anchored UEs (also called assisting UEs herein). In FIG. 4, as with FIG. 3, assume it is desired to obtain the location of target UE 310. Target UE 310 may be able to form Sidelink channels with nearby assisting UEs 420, 425, and 430. Assisting UEs 420-430 may be mobile UEs that are not anchored. The location of assisting UEs 420-430 may not be known or may not be accurately known. Target UE 310 may be attached to serving eNB 340 and may be able to receive positioning reference signals from neighboring UEs 350 and 360.

In the situation of FIG. 4, the coordinates of assisting UEs 420-430 may not be known in advance to assisting UEs 420-430 and/or at location server 260. Instead, the relative position of assisting UEs 420-430 and target UE 310 may be estimated jointly by collecting the results of the position metrics obtained from the Sidelink channels (i.e., the UE-UE position metrics). In some implementations, the relative positions of assisting UEs 420-430 may be combined with absolute position estimations (position estimations determined based on positioning reference signals transmitted by the eNBs). For example, first position metrics, based on the exchange of positioning reference signals between the UEs, and second position metrics, based on positioning reference signals transmitted from the eNBs to the UEs, may be forwarded to location server 260. Location server 260 may combine the first and second position metrics to calculate a relatively accurate absolute location for target UE 310.

Figure 5:
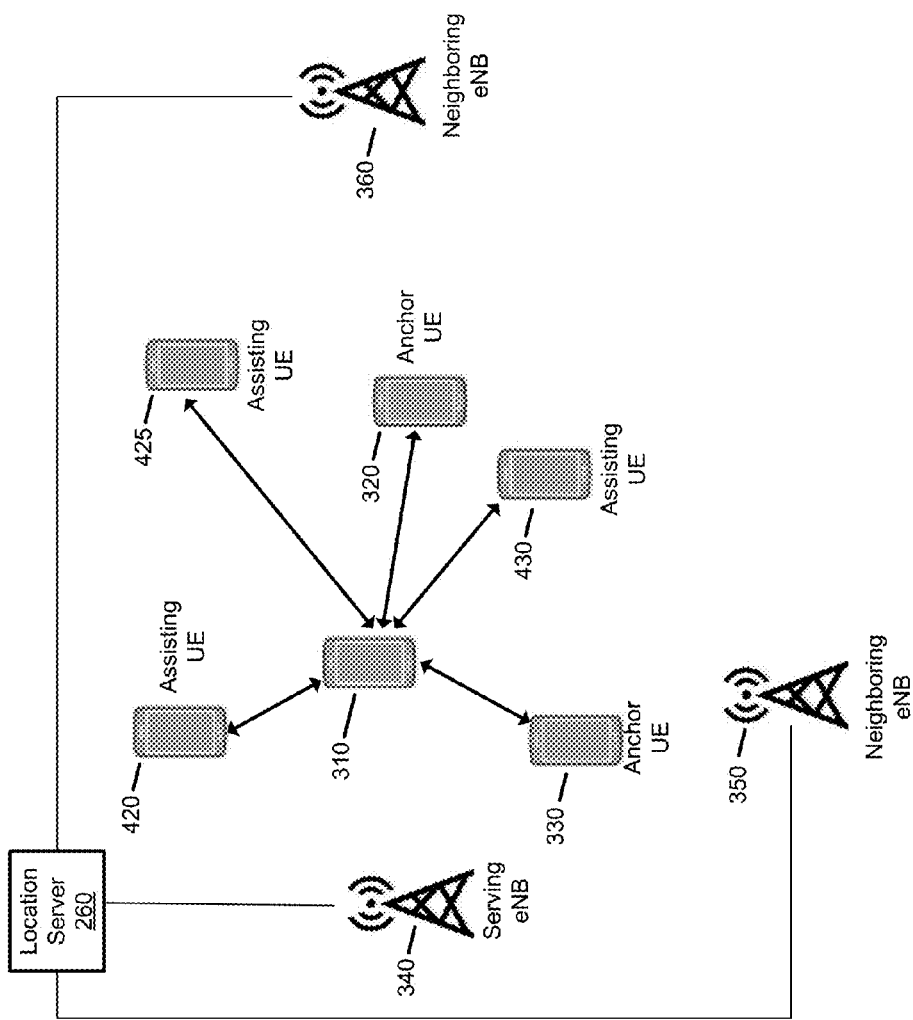
FIG. 5 is a diagram conceptually illustrating position determination, of a target UE, using a combination of anchor UEs and assisting UEs.

FIG. 5 is a diagram conceptually illustrating position determination, of a target UE, using a combination of anchor UEs and assisting UEs. In FIG. 5, as with FIGS. 3 and 4, assume it is desired to obtain the location of target UE 310. Target UE 310 may be able to form Sidelink channels with nearby anchor UEs 320-330 and with assisting UEs 420-430. In the situation of FIG. 5, location determination can be applied based on position metrics received from both the anchored UEs and the assisting UEs, as well as based on position metrics obtained with respect to serving eNB 340 and/or neighboring eNBs 350-360. For example, location server 260 may use multilateration-based techniques, based on position metrics received from anchor UEs 320-330, assisting UEs 420-430, eNBs 340-360, stored location coordinates of anchor UEs 320-330 and eNBs 340-360, to obtain a relatively accurate three-dimensional location of target UE 310.

Figure 6:
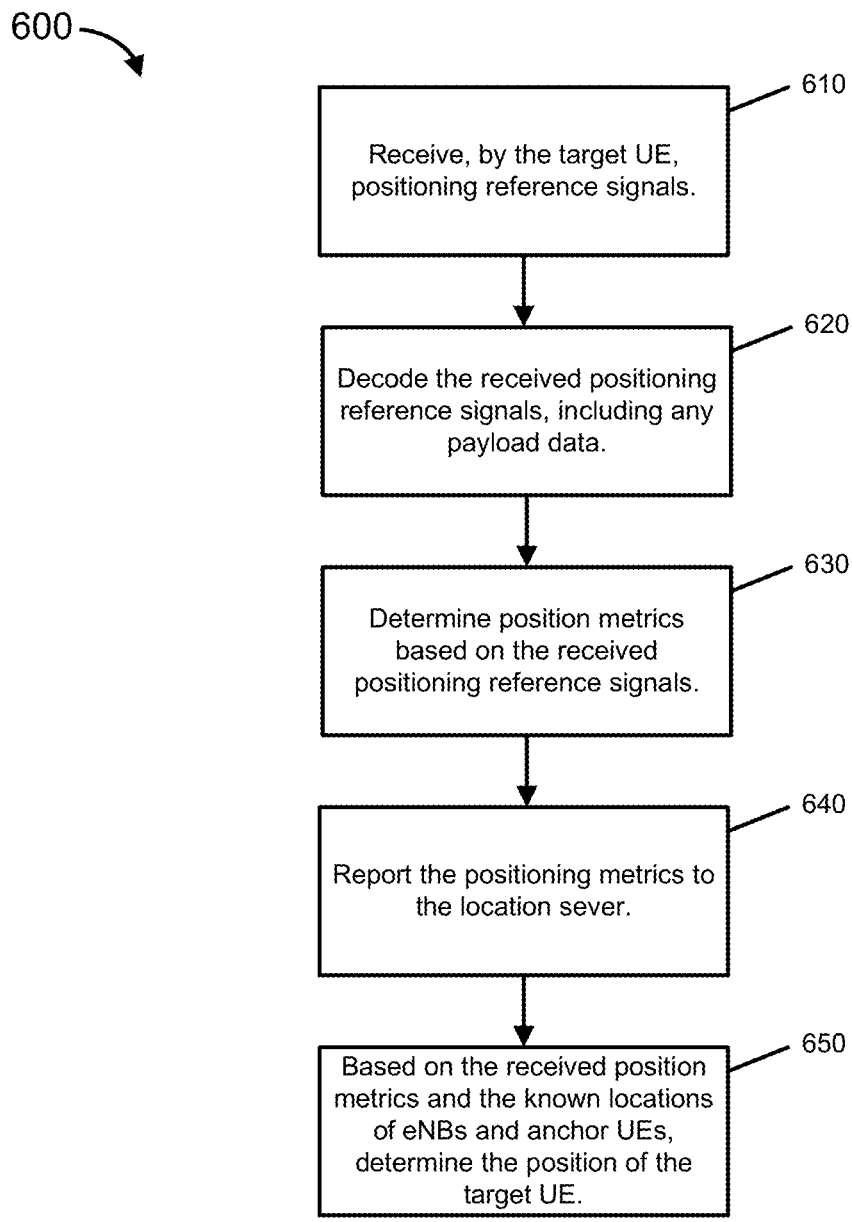
FIG. 6 is a flowchart illustrating an example process that may be used to determine the location of a target UE when Sidelink channels are available between the target UE and one or more other UEs.

FIG. 6 is a flowchart illustrating an example process 600 that may be used to determine the location of a target UE when Sidelink channels are available between the target UE and one or more other UEs. In the context of process 600, the other UEs may include anchored and non-anchored UEs. Additionally, although process 600 will primarily be described based on observed Time Difference of Arrival (TDOA) positioning technologies, other positioning technologies, such as those based on Time Of Arrival (TOA), may alternatively be used.

Process 600 may include receiving, by the target UE, positioning reference signals (block 610). As previously mentioned, the positioning reference signals may be signals received from other UEs, such as anchor UEs or non-anchored UEs, and/or from eNBs. In some implementations, the positioning reference signals may include signals that were transmitted using spectrum resources defined by the wireless network. For example, control signaling may be transmitted or broadcast to UEs 210-214 to configure the UEs to use particular spectrum resources for the positioning reference signals and/or to use particular timing parameters (e.g., parameters relating to particular uplink timing values, downlink timing values, Timing Advance values and/or other values), configuration parameters, or other parameters. In some implementations, the positioning reference signals may be of a configurable bandwidth. Additionally, the positioning reference signals may include or be associated with a payload data carrying positioning related information, such as a location (e.g., a coordinate value) of the transmitting UE or eNB.

In one implementation, the positioning reference signals may be based on the positioning reference signals described in releases 8-10 of the 3GPP standards. Alternatively or additionally, the positioning reference signals may include, or be based on, Channel State Information Reference Signals (CSI-RS) or Cell Specific Reference Signals (C-RS). As previously mentioned, wireless network 220 may transmit synchronization signals to synchronize internal clocks of UEs. Target UE 310 may use the received positioning reference signals (and its synchronized clock) to determine the signal arrival time differences, called the Reference Signal Timing Differences (RSTDs), between the positioning reference signals from the different transmitting devices (e.g., eNBs and UEs).

Process 600 may further include decoding the received positioning reference signals (block 620). As mentioned, in some implementations, a transmitted positioning reference signal may include payload data, such as a coordinate that defines the location of the UE that transmits the positioning reference signal. Decoding the receive positioning reference signals may include extracting any payload data (e.g., a location of an anchor UE) from the positioning reference signals.

Process 600 may further include determining position metrics based on the received positioning reference signals (block 630). The position metrics may include or be derived from timing values, such as values estimating the arrival times of the positioning reference signals and/or values representing differences in arrival times. The values representing the differences in arrival times may be estimated relative to the arrival time of a positioning reference signal from serving eNB 340 or from another configured reference cell. In some implementations, the received signal power of a positioning reference signal may also be used as a factor in estimating the arrival times and/or arrival time differences.

The timing values relating to transmission of the assisting/anchoring UEs can be estimated as one or more of the following.

Uplink (UL) timing, $T_{UL}$. $T_{UL}$ may be equal to $T_{DL}$+RTT, where $T_{DL}$ refers to the received downlink (DL) timing of serving eNB 340 and RTT represents the round trip time to serving eNB 340.

Downlink (DL) timing, $T_{DL}$. The timing relating to the arrival of the downlink positioning reference signal, from serving eNB 340, at the UE antenna connector.

TA/2 (Timing Advance) timing. TA/2 may represent the timing corresponding to the eNB transmission timing if RTT and DL timing are measured without errors. TA/2 may also be defined relative to serving eNB 340.

Other timing metrics or techniques.

Process 600 may further include reporting the position metrics to the location server (block 640). In one implementation, the position metrics may be reported using messages that are exchanged pursuant to a positioning protocol. The reported position metrics may include, for example, the RSTDs and positioning reference signal received power, for each UE (e.g., assisting or anchor UEs) and for each neighboring eNB. The messages may be relayed through serving eNB 340 to location server 260.

Process 600 may further include determining, based on the received position metrics and the locations of the eNBs and anchor UEs, the location of the target UE (block 650). As previously mentioned, the location determination can be performed based on the position metrics that were generated based on the positioning reference signals received from both the anchor UEs and the assisting UEs, as well as based on the position metrics generated based on the positioning reference signals received from serving eNB 340 and/or neighboring eNBs 350-360. For example, location server 260 may use multilateration-based techniques, based on position metrics received from anchor UEs 320-330, assisting UEs 420-430, eNBs 340-360, stored location coordinates of anchor UEs 320-330 and eNBs 340-360, to obtain a relatively accurate three-dimensional location of target UE 310.

In the above description of FIG. 6, timing values were generally described based on downlink transmission of positioning reference signals to the target UE. In some implementations, however, uplink transmissions may be used to generate the timing values. Using uplink transmissions to generate timing values may be referred to as Uplink Time Difference of Arrival (U-TDOA) herein. In U-TDOA, wireless network 220 (e.g., eNBs 340-360) may estimate time difference of arrival of positioning reference signals transmitted by target UE 310.

Figure 7:
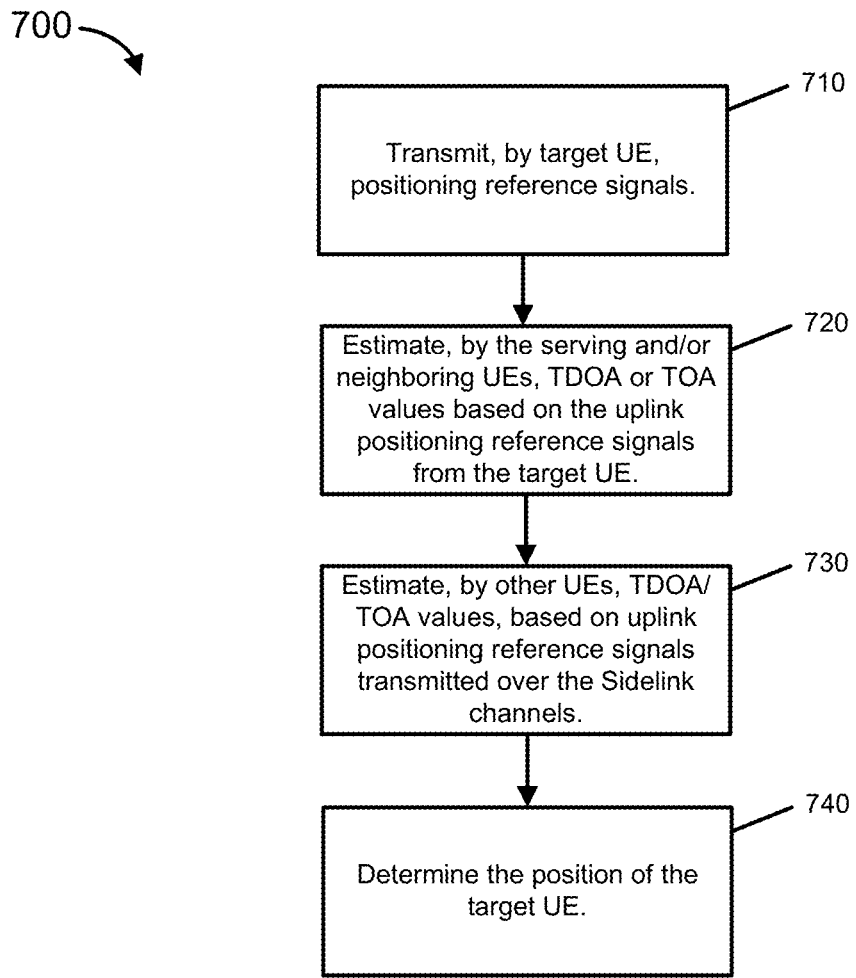
FIG. 7 is a flowchart illustrating an example process that may be used to determine the location of target UE based on uplink transmissions from the target UE.

FIG. 7 is a flowchart illustrating an example process 700 that may be used to determine the location of target UE 310 based on uplink transmissions, from target UE 310. To begin, process 700 may include transmitting, by the target UE, positioning reference signals (block 710). The transmission of the positioning reference signal may be scheduled by serving eNB 340 and/or may be transmitted using predefined channels or spectrum resources. In one implementation, the uplink transmission may be based on the 3GPP standardized Sounding Reference Signal (SRS) or Demodulation Reference Signal (DMRS). The uplink transmission may include payload data and/or may be configured to include wideband symbol sequences with good auto and cross-correlation properties. The positioning reference signals may be transmitted both over Sidelinks to nearby anchor and assisting UEs, and over the cellular or general wireless interface to wireless network 220.

Process 700 may further include estimating, by the serving eNB and/or the neighboring eNBs, TDOA or TOA values based on the uplink positioning reference signals from the target UE (block 720). The TDOA/TOA values may represent position metrics similar to those calculated by target UE 310 and as described with respect to FIG. 6.

Process 700 may further include estimating, by other UEs (e.g., anchor and assisting UEs that are nearby the target UE), TDOA/TOA values, based on the uplink positioning reference signals from the target UE and transmitted over the Sidelink channels (block 730). The TDOA/TOA values, along with other information, such as a signal strength of the positioning reference signal, may represent position metrics that may be transmitted to location server 260.

Process 700 may further include, determining, by location server 260, the location of the target UE (block 740). The location may be determined based on the position metrics (i.e., the TDOA/TOA values) received from anchor UEs 320-330, assisting UEs 420-430, serving eNB 340, and/or neighboring eNBs 350-360.

Eight examples covering the use of Sidelink channels to provide position metrics that can be used to determine the location of a UE will next be discussed.

Example 1. Observed TDOA for Anchored Device-to-Device Assistance

A network operator or mobile subscriber may install fixed anchor UEs at various locations. For example, the network operator may install a number of relatively low cost stationary anchor UEs at indoor retail establishments, sports venues, etc. Configuration information, relating to the positioning reference signals that are generated by the anchor UEs, may be provided, to UEs, using Radio Resource Control (RRC) layer signaling that is transmitted via wireless network 220. Alternatively this information may be pre-configured through the application layer. Target UE 310 may subsequently measure RSTDs, over Sidelink channels with the anchor UEs, and report the RSTD values, via wireless network 220, to location server 260.

Example 2. Observed TDOA for Non-Anchored Device-to-Device Assistance

This situation may correspond to the general use case of Example 1. The difference in this case is that the positions of assisting UEs 420-430 may not be known a priori at location server 260 or by a location application at the UE side. In this case, the locations of assisting UEs 420-430 and target UE 310 may be calculated jointly based on the position metrics obtained over the Sidelink channels and measurement of signal location parameters over cellular links. Location server 260 may collect the UE-UE position metrics from a cluster of UEs and apply a joint location determination technique to potentially provide a more precise location fix than for the case when each UE is located independently.

Example 3. U-TDOA Anchored Device-to-Device Assistance

In this situation, location server 260 may use position metrics obtained from UE-UE Sidelink channels to improve uplink based positioning approach. The UE-UE position metrics may be taken at both ends of the Sidelink channel (i.e., at target UE 310 and at anchor UEs 320-330).

Example 4. U-TDOA Non-Anchored Device-to-Device Assistance

This situation is similar to example 2, except that here the uplink time difference of arrival method may be used at the network side to perform position detection of target UE 310 and of assisting UEs 420-430.

Example 5. Synchronous UE-Based Anchored Positioning

This scenario assumes that target UE 310 can calculate its position by itself (e.g., based on satellite assisted location determination). Due to deployed synchronization (e.g., synchronization provided by wireless network 220), only one-way positioning reference signal transmission may be enough to estimate TOA/TDOA. In order to determine its location, target UE 310 may learn the location of the anchor UEs 320-330, such as via communications from higher layers of wireless network 220 or directly received in payload data associated with the positioning reference signals.

Example 6. Asynchronous UE-Based Anchored Positioning

This situation is similar to example 5, except that the UEs may not be synchronized and two-way timing estimation is needed to synchronize the UEs. In this case, target UE 310 may transmit a message, over the Sidelink channel, to an anchor UE, and receive, over the Sidelink channel, a synchronization response message from the anchor UE. The message exchange may be used to measure round trip time and/or establish common timing.

Example 7. Synchronous UE-Based Non-Anchored Positioning

This example is the generalized case of Example 5, where one or more UEs are not anchored (assisting UEs). In this case, a UE position map of the anchored and non-anchored UEs may be reconstructed based on using the Sidelink channel to exchange position metrics that can be used to locate the non-anchored UEs.

Example 8. Asynchronous UE-Based Non-Anchored Positioning

This situation may correspond to the general use case in which each timing/range estimation is done in two-way positioning and only a portion the UEs or eNBs have known locations.

FIG. 8 is a diagram of example components of a device 800. Each of the devices illustrated in FIGS. 1-5 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. User Equipment (UE) comprising:
 a non-transitory computer-readable medium to store processor executable instructions; and
 processing circuitry to execute the processor executable instructions to:
  connect with a cellular network via a radio interface;
  connect with one or more other UEs, using the radio interface, to form a direct connection with the other UEs;
  receive, via the direct connection with the other UEs, first positioning reference signals from which first timing information, relating distances between the UE and other UEs, is derivable;

determine, based on the first positioning reference signals, first position metrics that relate to a position of the UE with respect to the other UEs;
receive, via the cellular network, a second positioning reference signal from which second timing information, relating to distance between the UE and a base station associated with the cellular network, is derivable;
determine, based on the second positioning reference signal, a second position metric that relates to a position of the UE with respect to the base station; and
determine, based at least on the first and second position metrics, a location of the UE.

2. The UE of claim 1, wherein the processing circuitry, when determining the location of the UE, is further to:
calculate the location of the UE using multilateration-based or proximity detection techniques.

3. The UE of claim 1, wherein the processing circuitry, when determining the location of the UE, is further to:
transmit, via the cellular network, the first and second position metrics to a location server; and
receive, from the location server, an indication of the location of the UE.

4. The UE of claim 1, wherein the processing circuitry is further to:
decode payload data, associated with the first positioning reference signals, to obtain an indication of a location of one or more of the other UEs.

5. The UE of claim 1, wherein the processing circuitry is further to:
receive a plurality of positioning reference signals, from a corresponding plurality of the other UEs, wherein timing information, associated with the plurality of positioning reference signals, is synchronized based on a synchronization procedure performed via the cellular network.

6. The UE of claim 1, wherein the first timing information is synchronized, with the other UEs, based on a two-way timing estimation performed between the UE and the other UEs.

7. The UE of claim 1, wherein the first position metrics include one or more of:
positioning reference signal time of arrival;
differences in time of arrival between positioning reference signals;
differences in time of arrival between a positioning reference signal and a reference clock;
positioning reference signal received power;
positioning reference signal received quality;
timing estimation accuracy indicators;
location information; or
timing information sufficient for solution of location equations.

8. The UE of claim 1, wherein the processing circuitry is further to:
receive configuration information, via the cellular network, relating to a configuration of the first positioning reference signals.

9. The UE of claim 1, wherein the location of the UE is determined locally, by the UE, by an application that receives at least the first and second position metrics from lower layer processing at the UE.

10. User Equipment (UE) comprising:
a radio interface;
a computer-readable medium to store processor executable instructions; and
processing circuitry to execute the processor executable instructions to:
connect, via a Sidelink channel associated with the radio interface, with a second UE that is in proximity to the UE;
connect, via the radio interface, with a cellular network;
transmit, to the second UE and over the Sidelink channel, a first positioning reference signal from which first timing information, relating to a distance between the UE and second UE, is derivable;
transmit, via the radio interface, a second positioning reference signal from which second timing information, relating to a distance between the UE and a base station associated with the cellular network, is derivable; and
receive, from a location server and via the radio interface, a location of the UE that was determined based at least on the first and second positioning reference signals.

11. The UE of claim 10, wherein the location server, when determining the location of the UE, is further to:
calculate the location of the UE using multilateration-based or proximity detection techniques.

12. The UE of claim 10, wherein the processing circuitry is further to execute the processor executable instructions to:
transmit a plurality of positioning reference signals, to a plurality of additional UEs, via a corresponding plurality of additional Sidelink channel spectrum resources.

13. The UE of claim 10, wherein the first timing information is synchronized based on a synchronization procedure performed via the cellular network.

14. The UE of claim 10, wherein the first timing information includes:
information relating to a positioning reference signal time of arrival;
information relating to differences in time of arrival between positioning reference signals; or
information relating to differences in time of arrival between a positioning reference signal and a reference clock.

15. A location sever comprising:
a non-transitory computer-readable medium to store processor executable instructions; and
processing circuitry to execute the processor executable instructions to:
store indications of locations of a plurality of anchor User Equipment (UE) deployed as part of a wireless network;
receive first position metrics from the plurality of anchor UEs, the first position metrics including information relating to a position of a target UE relative to the plurality of anchor UEs, wherein the first position metrics are based on communication of positioning reference signals exchanged over Sidelink channels formed between the target UE and the plurality of anchor UEs;
receive second position metrics relating to a position of the target UE relative to base stations in a wireless cellular network;
receive third position metrics from a plurality of non-anchor UEs; and
calculate, based on the first, second, and third position metrics, a location of the target UE.

16. The location sever of claim 15, wherein the plurality of anchor UEs are each associated with a fixed location.

17. The location sever of claim 15, wherein the processing circuitry is further to:
  transmit the calculated location of the target UE to the target UE.

18. The location server of claim 15, wherein the calculation of the location of the target UE is based on a multilateration-based technique.

19. The location server of claim 15, wherein the processing circuitry is further to:
  transmit the calculated location of the target UE to the target UE.

20. A method implemented by User Equipment (UE), the method comprising:
  connecting with a cellular network using a radio interface;
  connecting with a second UE, using the radio interface, to form a direct connection with the second UE;
  receiving, via the direct connection with the second UE, a first positioning reference signal from which first timing information, relating to distance between the UE and second UE, is derivable;
  determining, based on the first positioning reference signal, a first position metric that relates to a position of the UE with respect to the second UE;
  receiving, via the cellular network, a second positioning reference signal from which second timing information, relating to distance between the UE and a base station associated with the cellular network, is derivable;
  determining, based on the second positioning reference signal, a second position metric that relates to a position of the UE with respect to the base station; and
  determining, based at least on the first and second position metrics, a location of the UE.

21. The method of claim 20, wherein determining the location of the UE further includes:
  calculating the location of the UE using multilateration-based or proximity-based techniques.

22. The method of claim 20, further comprising:
  decoding payload data, associated with the first positioning reference signal, to obtain an indication of a location of the second UE.

23. The method of claim 20, further comprising:
  receiving a plurality of positioning reference signals, from a corresponding plurality of additional UEs, wherein timing information, associated with the plurality of positioning reference signals, is synchronized based on a synchronization procedure performed via the cellular network.

24. The method of claim 20, wherein the first positioning reference signal includes timing information that is synchronized, with the second UE, based on a two-way timing estimation performed between the UE and the second UE.

25. The method of claim 20, wherein the first position metric includes one or more of:
  positioning reference signal time of arrival;
  differences in time of arrival between positioning reference signals;
  differences in time of arrival between a positioning reference signal and a reference clock;
  positioning reference signal received power; or
  positioning reference signal received quality.

* * * * *